C. BUSCH.
Steamer and Boiler.

No. 163,735. Patented May 25, 1875.

WITNESSES
Mary P. Utley.
Geo. E. Upham.

INVENTOR
Carl Busch.
Chipman Hosmer & Co.
ATTORNEYS

UNITED STATES PATENT OFFICE.

CARL BUSCH, OF EL PASO, ILLINOIS.

IMPROVEMENT IN STEAMERS AND BOILERS.

Specification forming part of Letters Patent No. 163,735, dated May 25, 1875; application filed March 27, 1875.

*To all whom it may concern:*

Be it known that I, CARL BUSCH, of El Paso, in the county of Woodford and State of Illinois, have invented a new and valuable Improvement in Steamers and Boilers; and I do hereby declare that the following is a full, clear, and exact description of the construction and operation of the same, reference being had to the annexed drawings, making a part of this specifiation, and to the letters and figures of reference marked thereon.

Figure 1:
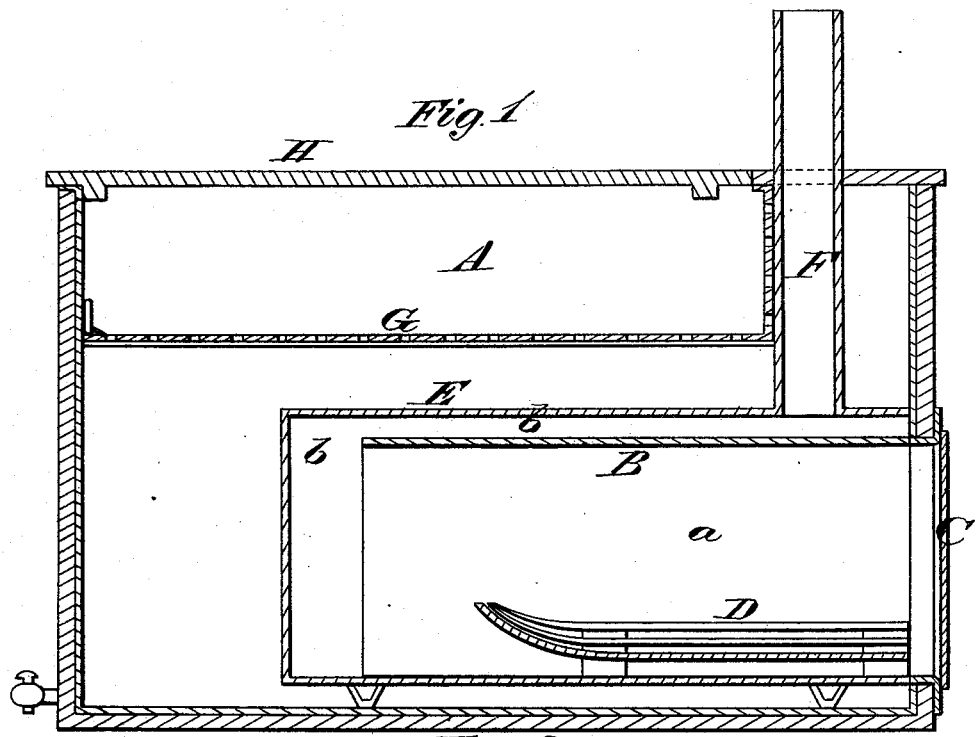
Figure 2:
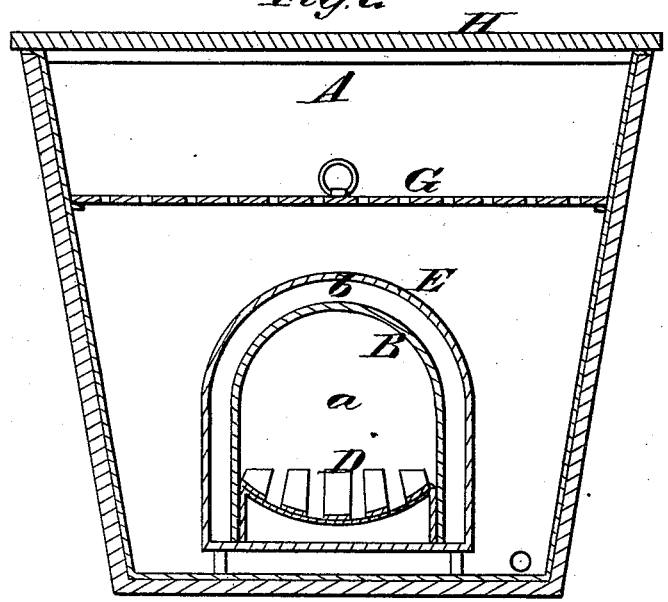

Figure 1 of the drawing is a representation of a longitudinal vertical section of my steamer and boiler, and Fig. 2 is a tranverse vertical sectional view of the same.

This invention has relation to apparatuses which are designed for steaming and boiling grain, and preparing food for stock, and for other purposes; and the nature of my invention consists in the arrangement within a wooden chest, which is lined with metal, of a furnace having an exterior casing, which forms a flue leading from the rear end of the furnace-chamber to an escape-pipe which is located near the front end of this chamber, as will be hereinafter explained.

In the annexed drawings, A designates the chest of the steamer, which may be of any suitable capacity, and which is constructed of wood, lined with metal. The metal lining will render the chest water-proof, and prevent the wood from splitting.

B designates an arched wall, inclosing a furnace-chamber, *a*, and having a door, C, with a register in it. Inside of the furnace-chamber, and supported upon the floor thereof, is a grate, D, which I make concave, for causing the coals to concentrate toward its center, and preventing them from falling off of its sides. The rear end of the furnace-wall B is open, and terminates short of the rear end of an arched casing, E, which forms a flue-space, *b*, about the sides and top of the wall B. Near the front end of the casing E is an escape-pipe, F, which leads out of the top of the chest A, and conducts off the products of combustion.

It will be seen that water put into the chest A will be exposed to heat from the bottom of the furnace-chamber, and also to heat from the sides and top of the casing E.

G is a removable perforated shelf, which rests on ledges above the water-line of the boiler, and which is used for supporting food or clothes to be steamed, at the same time that food is being boiled in the water beneath it. H is a removable cover.

What I claim as new, and desire to secure by Letters Patent, is—

1. The chest A, having the casing E and escape-pipe F, in combination with the removable furnace B and grate D, substantially as and for the purpose set forth.

2. In an agricultural boiler, the chest A, having supporting-flanges, in combination with the perforated shelf G, casing E, and furnace B, substantially as and for the purpose set forth.

In testimony that I claim the above I have hereunto subscribed my name in the presence of two witnesses.

CARL BUSCH.

Witnesses:
 WALTER BENNETT,
 J. H. MILLER.